United States Patent [19]

LaPadura

[11] Patent Number: 4,674,981
[45] Date of Patent: Jun. 23, 1987

[54] MODELING DEVICE

[76] Inventor: Nathan P. LaPadura, 508 Brinley Ave., #5, Bradley Beach, N.J. 07720

[21] Appl. No.: 772,054

[22] Filed: Sep. 3, 1985

[51] Int. Cl.$^4$ ............................................. G09B 19/10
[52] U.S. Cl. ..................................................... 434/82
[58] Field of Search ................. 428/542.4, 16; 434/82, 434/250, 256, 295, 296, 297, 82; 446/107, 374; 52/648

[56] References Cited

U.S. PATENT DOCUMENTS

| 1,434,182 | 10/1922 | Zengen | 428/16 X |
| 1,591,661 | 7/1926 | Dinsdale | 446/374 |
| 2,044,949 | 6/1936 | Levy | 446/374 |
| 2,109,422 | 2/1938 | Haughton | 446/374 |
| 2,545,210 | 3/1951 | Moore | 434/82 |
| 2,803,903 | 8/1957 | Barry | 434/82 |
| 3,055,119 | 9/1962 | McEwen | 434/82 |
| 3,064,365 | 11/1962 | Ganne | 434/82 |
| 3,301,725 | 1/1967 | Frontera | 428/542.4 X |
| 3,395,484 | 8/1968 | Smith | 446/374 |
| 4,009,534 | 3/1977 | Bradt | 428/542.4 X |
| 4,123,872 | 11/1978 | Silva | 446/374 |

FOREIGN PATENT DOCUMENTS 418713 12/1933 United Kingdom ................ 446/374

OTHER PUBLICATIONS

*The Technique of Sculpture,* by John W. Mills, Reinhold Publishing Corp. ©1965, pp. 98–103.

Primary Examiner—William H. Grieb
Attorney, Agent, or Firm—Stanger, Michaelson and Einschlag

[57] ABSTRACT

Devices for modeling a large variety of forms—such as: humans, primates, monsters, animals, birds, fish, planes, rocket ships, abstract forms and so forth—are disclosed.

An embodiment of the present invention comprises a first wire having bends at predetermined positions thereof and further wires affixed to the first wire at predetermined positions thereon. The first wire serves both as part of an armature formed by the first and further wires and as a support for the armature. Further embodiments include a base having an aperture therein. In one such embodiment, the first wire is bent so that a double thickness thereof is removably inserted into the aperture. In another such embodiment, an end of the first wire is removably inserted into the aperture.

10 Claims, 12 Drawing Figures

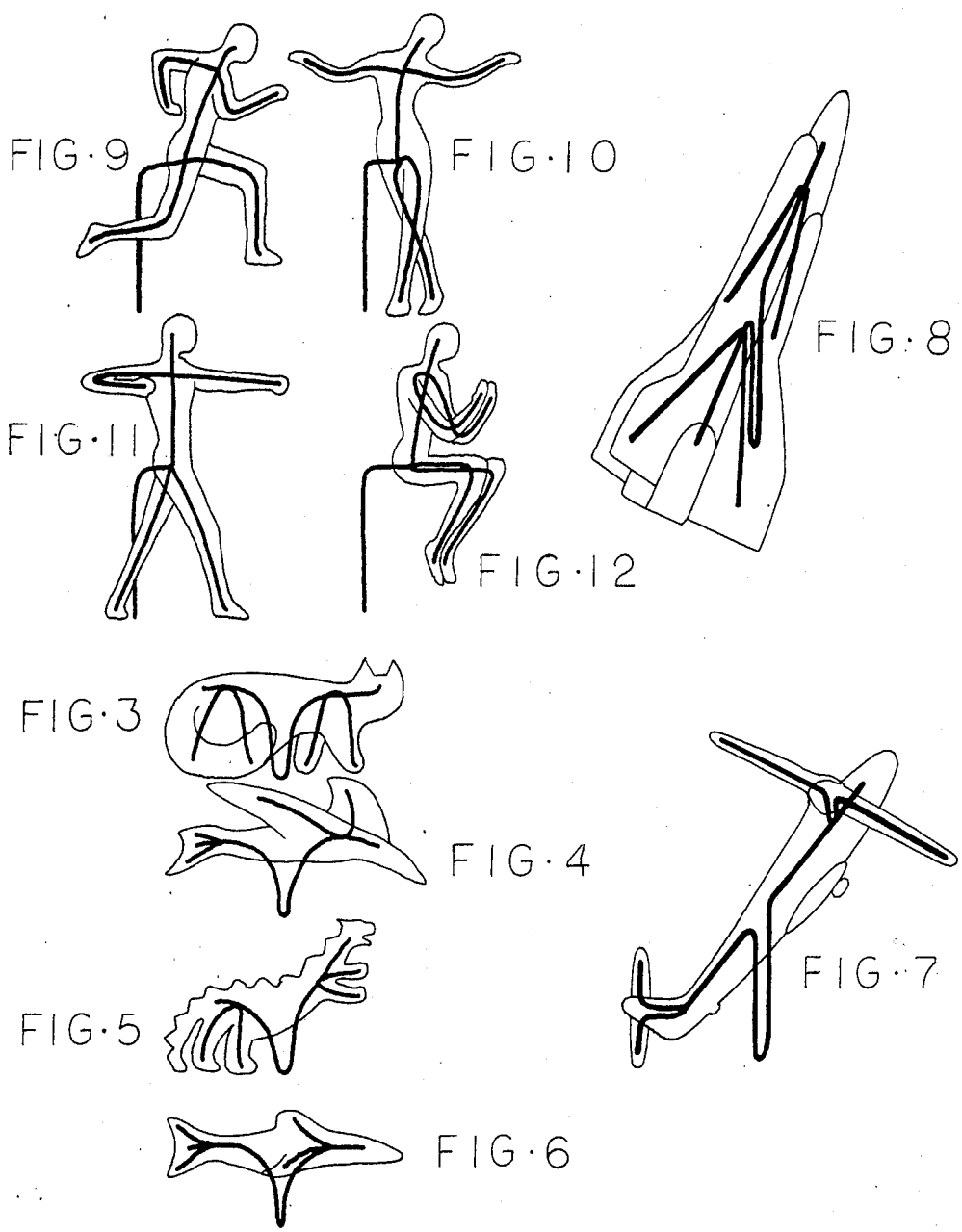

MODELING DEVICE

BACKGROUND OF THE INVENTION

The present invention pertains to the art of modeling and, in particular, to modeling devices, including armatures, for receiving and retaining materials such as modeling clay.

In modeling an article with modeling materials such as clay and/or other plastic or formable materials, one normally uses a modeling device as a support for the modeling material during the process of forming the article and for the article itself when formed. An armature is such a modeling device.

For the most part, armatures known in the art consist of rods and wires that are cut to particular sizes and then connected and fashioned into frameworks of selected shapes. The frameworks are then attached to separate pipes which support and maintain them in an upright position. Such pipes are usually in the form of an an inverted "L" and have a flange at their base. The pipes are shaped in this manner in order to keep them from interferring with the modeling of the figure. Armatures known in the art include those shown in U.S. Pat. No. 2,545,210 (an armature comprising a twisted wire frame which is supported in a vertically adjustable collar); U.S. Pat. No. 2,803,903 (a knockdown skeleton frame comprising a plurality of interlocking members); U.S. Pat. No. 3,055,119 (a skelton armature comprising inner and outer telescoping members that may be adjustably secured together in various positions of relative rotation and longitudinal extension); and U.S. Pat. No. 3,064,365 (a model device comprising flat members lying in transverse planes—each member being configured to a desired shape—and a plurality of members forming ribs or webs lying in planes transverse to the planes of the other members and configured to provide a desired external shape).

In the main, the modeling devices known in the art are bulky, are not easily adapted for modeling different objects, and are expensive. Thus, a need exists in the art for a simple, inexpensive, versatile modeling device.

SUMMARY OF THE INVENTION

Embodiments of the present invention are devices for modeling a large variety of forms—such as: humans, primates, monsters, animals, birds, fish, planes, rocket ships, abstract forms and so forth.

An embodiment of the present invention comprises a first bendable, flexible member having bends at predetermined positions thereof and further bendable, flexible members affixed to the first bendable, flexible member at predetermined positions thereon. The first member advantageously serves both as part of an armature formed by the first and further members and as a support for the armature.

Further embodiments include a base having an aperture therein. In one such embodiment, the first bendable, flexible member is bent so that a double thickness thereof is removably inserted into the aperture. In another such embodiment, an end of the first bendable, flexible member is removably inserted into the aperture.

In preferred embodiments of the present invention, the first bendable, flexible member is a thick, coated wire; the further bendable, flexible members are uncoated wires having a smaller diameter than that of the first wire; and the further members are affixed to the first member by wrapping them around the first member.

BRIEF DESCRIPTION OF THE DRAWING

A complete understanding of the present invention may be gained by considering the following detailed description in conjunction with the accompanying drawing, in which:

FIGS. 3-8 show, in pictorial form, various forms that can be modeled by using the embodiment shown in FIG. 1; and FIGS. 9-12 show, in pictorial form, various forms that can be modeled by using the embodiment shown in FIG. 2.

DETAILED DESCRIPTION

Embodiments of the present invention are modeling devices which support modeling material during the process of forming an article and for the article itself when formed. These embodiments are used to support any modeling material that has plasticity—such as: clay, plaster of Paris, papier mache, cement, rubber, plastic resin, and any other formable material.

Figure 1:
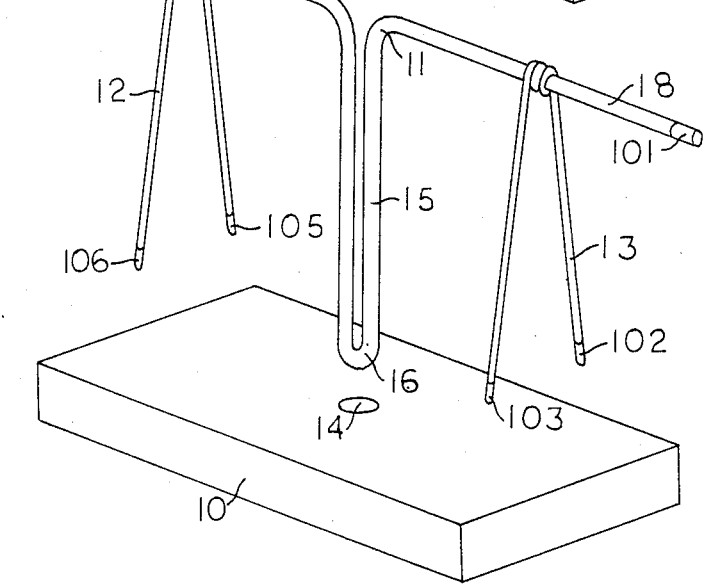
FIG. 1 shows, in pictorial form, a first modeling device fabricated in accordance with the present invention.

FIG. 1 shows, in pictorial form, an embodiment of the present invention which is principally for use in forming animals and the like. The device includes base 10 having aperture 14 formed therein. The base may be formed of wood, plastic, metal or other material and presents a base upon which the rest of the device is supported. In a preferred embodiment, base 10 is formed from wood and aperture 14 is formed by a chisel.

Bendable, flexible member 11, illustratively formed from wire, is bent into a "T". Base 16 of the "T" is inserted into aperture 14 in base 10. Member 11 can be removed from base 10 so that the model can be worked on while being held in the modeler's hand.

Bendable, flexible members 12 and 13, illustratively formed from wire, are wrapped about arms 17 and 18 of the "T" formed by member 11. In practice, members 11, 12 and 13 could be formed from materials other than wire, for example plastic. Members 12 and 13 form the "legs" of an animal shape if the device shown in FIG. 1 is used to model an animal. Members 12 and 13 and arms 17 and 18 of member 11 form an armature and section 15 of member 11 serves as a support therefor.

The bendable, flexible members of the embodiment shown in FIG. 1 permit the assembly to be bent to any shape desired, depending upon the figure to be modeled and its posture or position. For example, members 12 and 13 may be bent back to form the wings and tail of a bird or an airplane or the fins of a fish and so forth. In addition, one part of arm 17, extending beyond the point at which member 12 is attached thereto, may be used to form the head of an animal, bird and so forth. Examples of figures which may be modeled with the embodiment of FIG. 1 are shown in FIGS. 3-9. FIG. 3 shows a cat, FIG. 4 shows a bird, FIG. 5 shows a pre-historic animal, FIG. 6 shows a fish, FIG. 7 shows a helicopter and FIG. 8 shows a rocket ship.

In a preferred embodiment of the device shown in FIG. 1, member 11 is a thick, coated wire—such as no.

10 gauge aluminum insulated wire obtained from the Cadillac Cable Corporation of Pottsville, Pa.—and members 12 and 13 are thinner, uncoated wires—such as no. 19 gauge aluminum wire obtained from the Cadillac Cable Corporation of Pottsville, Pa. Further, the ends of all the wires have protective coatings 101–106 affixed thereto for safety. They help prevent a modeler, for example a child, from cutting himself. In a preferred embodiment, the protective coatings are formed by dipping the ends of the wires into liquid latex. When the wires are removed from the liquid, the latex dries within minutes at room temperature to provide the protective coating.

Figure 2:
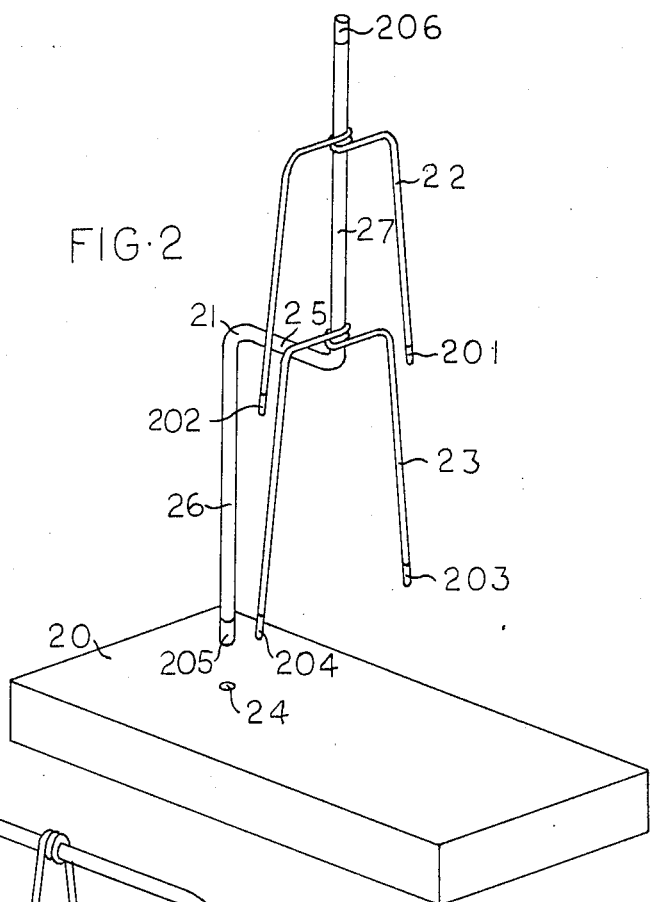
FIG. 2 shows, in pictorial form, a second modeling device fabricated in accordance with the present invention.

FIG. 2 shows, in pictorial form, an embodiment of the present invention which is principally for use in building a study of the human figure. The device includes base 20 having aperture 24 formed therein. The base may be formed of wood, plastic, metal or other material and presents a base upon which the rest of the device is supported. In a preferred embodiment, base 20 is formed from wood and aperture 24 is formed therein by a chisel.

Bendable, flexible member 21, illustratively formed from wire, is bent to have ledge 25. The end of section 26 of member 21 is inserted into aperture 24 in base 20. Member 21 can be removed from base 20 so that the model can be worked on while being held in the modeler's hand.

Bendable, flexible members 22 and 23, illustratively formed from wire, are wrapped about member 21 so as to form the shoulders and arms and the hips and legs, respectively, of a human shape. In practice, members 21, 22 and 23 could be formed from materials other than wire, for example plastic. Members 22 and 23 and section 27 of member 21 form an armature and sections 25 and 26 of member 21 serve as a support therefor. The bendable, flexible members of the embodiment shown in FIG. 2 permit the assembly to be bent to any shape desired, depending upon the figure to be modeled and its posture or position. Examples of figures which may be modeled with the embodiment of FIG. 2 are shown in FIGS. 9–12. FIG. 9 shows a running figure, FIG. 10 shows a dancing figure, FIG. 11 shows an archer, and FIG. 12 shows a reading figure.

In a preferred embodiment of the device shown in FIG. 2, member 21 is a thick, coated wire—such as no. 10 gauge aluminum insulated wire obtained from the Cadillac Cable Corporation of Pottsville, Pa.—and members 22 and 23 are thinner, uncoated wires—such as no. 19 gauge aluminum wire obtained from the Cadillac Cable Corporation of Pottsville, Pa. Further, the ends of all the wires have protective coatings 201–206 affixed thereto for safety. They help prevent a modeler, for example a child, from cutting himself. In a preferred embodiment, the protective coatings are formed by dipping the ends of the wires into liquid latex. When the wires are removed from the liquid, the latex dries within minutes at room temperature to provide the protective coating.

Note, as discussed above, the members comprising the devices shown in FIGS. 1 and 2 may be adjustably positioned in various positions of relative rotation and longitudinal extension to simulate inclining shapes and/or various action positions of the figures to be modeled and they will sustain themselves in these positions while the modeling clay is being applied, as for example by a child. A preferred method of applying a plastic material, illustratively modeling clay, to the device is to apply thin coils to the armature portion thereof to build up a "muscle" structure. Then further clay is wrapped about the "muscles" to fill out the figure.

Additional embodiments of the present invention may be fabricated where the members are affixed to each other by glue and/or by any other means. Further, embodiments of the modeling device which do not include a base, as well as those that include a base, can be fabricated in a single piece from an injection mold.

It should be clear that some embodiments of the inventive modeling device comprise the structure formed from the flexible, bendable members alone, whereas other embodiments comprise the structure along with a base. In addition, for some of those embodiments having a base, the structure is removably inserted into the base, whereas for others, the structure is affixed to the base. In embodiments without a base, the device may be affixed to or be removably supported by a base after a figure has been modeled thereon.

It should also be clear to those skilled in the art that further embodiments of the present invention may be made by those skilled in the art without departing from the teachings of the present invention.

What is claimed is:

1. A modeling device for use with plastic materials such as clay which comprises:
   a first bendable, flexible member comprising a first, a second and a third part, the first part depending downward from the second part and being connected from a first end to the second part at a first end thereof, the third part extending upward from the second part at a second end thereof, wherein the first and third parts are spaced apart from each other;
   a base having an aperture therein, the first member being removably inserted into the aperture at a second end thereof; and
   second and third further bendable, flexible members affixed to the first bendable, flexible member by wrapping, the second further flexible member being wrapped around the first flexible member substantially at the location where the first and second parts of the first member are connected, the third further flexible member being wrapped around the first flexible member on the third part thereof, wherein the third part of the first member, along with the further members, form an armature, the second part of the first member holds the armature away from the first part of the first member, and the first part of the first member serves as (1) a means for holding the device in a sculptor's hand so that the armature may have plastic material applied thereto at various positions without interference from the sculptor's hand and (2) a support for the armature when it is inserted into the base.

2. The modeling device of claim 1 wherein the first flexible, bendable member is a first wire and the further bendable, flexible members are further wires.

3. The modeling device of claim 2 wherein:
   the first part and second part are connected at substantially a right angle and
   the second part and the third part are connected at substantially a right angle.

4. The modeling device of claim 3 wherein the first wire is coated.

5. The modeling device of claim 4 wherein the diameter of the first wire is greater than the diameter of the further wires and all the wires have latex tips at the ends thereof.

6. A modeling device for use with plastic materials such as clay which comprises:
- a first bendable, flexible member comprising a first, a second, a third part and a fourth part, the first part extending outward from the second part and being connected to the second part at a first end thereof, the third part being disposed relatively closely to the second part along its length and extending upward at a first end from the second part at a second end thereof, the fourth part extending outward from the third part and being connected to a second end thereof;
- a base having an aperture therein, the first member being removably inserted into the aperture at the connection of the second and third parts thereof; and
- second and third further bendable, flexible members affixed to the first bendable, flexible member by wrapping, the second further flexible member being wrapped around the first flexible member on the first part thereof, the third further flexible member being wrapped around the first flexible member on the fourth part thereof, wherein the first and fourth parts of the first member, along with the further members, form an armature, and the second and third parts of the first member serve as (1) a means for holding the device in a sculptor's hand so that the armature may have plastic material applied thereto at various positions without interference from the sculptor's hand and (2) a support for the armature when they are inserted into the base.

7. The modeling device of claim 6 wherein the first flexible, bendable member is a first wire and the further bendable, flexible members are further wires.

8. The modeling device of claim 7 wherein:
- the first part and the second part are connected at substantially a right angle and
- the third part and the fourth part are connected at substantially a right angle.

9. The modeling device of claim 8 wherein the first wire is coated.

10. The modeling device of claim 9 wherein the diameter of the first wire is greater than the diameter of the further wires and all the wires have latex tips at the ends thereof.

* * * * *